(12) United States Patent
Lee et al.

(10) Patent No.: US 7,917,008 B1
(45) Date of Patent: Mar. 29, 2011

(54) INTERFACE FOR RESOLVING RECORDING CONFLICTS WITH NETWORK DEVICES

(75) Inventors: Robert N. Lee, Fremont, CA (US); Patrick M. Ellis, Redwood City, CA (US); Benjamin Fuller, Redwod City, CA (US); Robert M. Gregory, legal representative, Gilbert, AZ (US)

(73) Assignee: The Directv Group, Inc., El Segundo, CA (US)

( * ) Notice: Subject to any disclaimer, the term of this patent is extended or adjusted under 35 U.S.C. 154(b) by 1796 days.

(21) Appl. No.: 10/124,064

(22) Filed: Apr. 16, 2002
(Under 37 CFR 1.47)

Related U.S. Application Data

(60) Provisional application No. 60/313,546, filed on Aug. 19, 2001.

(51) Int. Cl.
*H04N 5/76* (2006.01)
*G06F 3/00* (2006.01)
*H04N 5/445* (2006.01)
*G06F 15/167* (2006.01)

(52) U.S. Cl. .......... 386/291; 386/295; 386/297; 725/58; 725/61; 709/216; 709/226

(58) Field of Classification Search ............... 725/58, 725/61; 386/291, 295, 297
See application file for complete search history.

(56) References Cited

U.S. PATENT DOCUMENTS

| | | | |
|---|---|---|---|
| 4,485,219 A | 11/1984 | Falk et al. | |
| 5,333,091 A | 7/1994 | Iggulden et al. | 360/14.1 |
| 5,455,630 A | 10/1995 | McFarland et al. | 348/476 |
| 5,485,219 A | 1/1996 | Woo | |
| 5,532,735 A | 7/1996 | Blahut et al. | |
| 5,600,366 A | 2/1997 | Schulman | |
| 5,652,615 A | 7/1997 | Bryant et al. | |
| 5,661,516 A | 8/1997 | Carles | |
| 5,664,948 A | 9/1997 | Dimitriadis et al. | |
| 5,692,093 A | 11/1997 | Iggulden et al. | 386/46 |

(Continued)

FOREIGN PATENT DOCUMENTS

AU   694568   3/1996

(Continued)

OTHER PUBLICATIONS

Gotuit Video Slide Show, http://www.gotuit.com/slides/slide1.htm., printed Jun. 13, 2002.

(Continued)

*Primary Examiner* — Hoang-Vu A Nguyen-Ba
(74) *Attorney, Agent, or Firm* — McDonnell Boehnen Hulbert & Berghoff LLP

(57) ABSTRACT

Communication and resolution of potential recording conflicts are disclosed. In one aspect, a request for recording a new program is received, and recording schedules are examined to determine whether another program had been previously scheduled for recording at the same time. If so, a display that illustrates and allows resolution of the conflict is automatically provided. In another aspect, a recording queue and an exception list provide efficient identification of conflicts and management of scheduled recordings. The recording queue lists each program to be recorded, and the exception list identifies conflicting pairs in the recording queue and indicates which item in each pair is respectively retained (preempting) and deferred (preempted). Canceling a preempting recording removes it from the recording queue and the conflict from the exception list to reinstate a preempted program. Channel guides that illustrate recording conflicts are also provided.

30 Claims, 14 Drawing Sheets

U.S. PATENT DOCUMENTS

| | | | | |
|---|---|---|---|---|
| 5,696,866 | A | 12/1997 | Iggulden et al. | 386/46 |
| 5,724,472 | A | 3/1998 | Abecassis | |
| 5,848,397 | A | 12/1998 | Marsh et al. | |
| 5,886,731 | A | 3/1999 | Ebisawa | |
| 5,892,536 | A | 4/1999 | Logan et al. | |
| 5,986,692 | A | 11/1999 | Logan et al. | |
| 5,987,210 | A | 11/1999 | Iggulden et al. | 386/46 |
| 5,995,092 | A | 11/1999 | Yuen et al. | |
| 5,999,688 | A | 12/1999 | Iggulden et al. | 386/46 |
| 6,055,560 | A * | 4/2000 | Mills et al. | 709/200 |
| 6,177,931 | B1 | 1/2001 | Alexander et al. | |
| 6,215,526 | B1 | 4/2001 | Barton et al. | 348/473 |
| 6,226,444 | B1 | 5/2001 | Goldschmidt Iki et al. | |
| 6,233,389 | B1 | 5/2001 | Barton et al. | 386/46 |
| 6,310,886 | B1 | 10/2001 | Barton | 370/462 |
| 6,324,338 | B1 | 11/2001 | Wood et al. | 386/83 |
| 6,327,418 | B1 | 12/2001 | Barton | 386/46 |
| 6,360,053 | B1 | 3/2002 | Wood et al. | 356/67 |
| 6,456,308 | B1 * | 9/2002 | Agranat et al. | 715/854 |
| 6,671,454 | B1 * | 12/2003 | Kaneko et al. | 386/83 |
| 6,772,433 | B1 * | 8/2004 | LaJoie et al. | 725/52 |
| 7,143,353 | B2 | 11/2006 | McGee et al. | |
| 2001/0014891 | A1 | 8/2001 | Hoffert et al. | |
| 2001/0028782 | A1 * | 10/2001 | Ohno et al. | 386/46 |
| 2002/0065678 | A1 | 5/2002 | Peliotis et al. | |
| 2002/0092021 | A1 * | 7/2002 | Yap et al. | 725/55 |
| 2002/0092022 | A1 * | 7/2002 | Dudkicwicz et al. | 725/58 |
| 2002/0154892 | A1 * | 10/2002 | Hoshen et al. | 386/87 |
| 2002/0174430 | A1 * | 11/2002 | Ellis et al. | 725/46 |
| 2003/0093792 | A1 * | 5/2003 | Labeeb et al. | 725/46 |
| 2003/0126598 | A1 | 7/2003 | Agnihotri et al. | |
| 2003/0167473 | A1 | 9/2003 | Klosterman et al. | |
| 2004/0045020 | A1 | 3/2004 | Witt et al. | |
| 2005/0154681 | A1 * | 7/2005 | Schmelzer | 705/67 |
| 2005/0216942 | A1 * | 9/2005 | Barton | 725/97 |
| 2005/0240295 | A1 * | 10/2005 | Vilcauskas et al. | 700/94 |
| 2005/0273819 | A1 * | 12/2005 | Knudson et al. | 725/58 |
| 2005/0283810 | A1 * | 12/2005 | Ellis et al. | 725/93 |
| 2007/0136445 | A1 * | 6/2007 | Sweatt et al. | 709/219 |

FOREIGN PATENT DOCUMENTS

| | | | |
|---|---|---|---|
| DE | 199 39 410 | A1 | 3/2001 |
| EP | 0 693 215 | B1 | 11/1998 |
| EP | 1 071 287 | A2 | 1/2001 |
| JP | 07-021619 | * | 1/1995 |
| WO | WO 99/04561 | | 1/1999 |
| WO | 99/52279 | A1 | 10/1999 |
| WO | WO 99/52285 | | 10/1999 |
| WO | 00/07368 | A1 | 2/2000 |
| WO | 00/18108 | A2 | 3/2000 |
| WO | 00/18108 | A3 | 3/2000 |
| WO | 00/28736 | A1 | 5/2000 |
| WO | WO 00/44171 | | 7/2000 |
| WO | WO 00/56072 | | 9/2000 |
| WO | 00/58833 | A1 | 10/2000 |
| WO | 00/58834 | A1 | 10/2000 |
| WO | 00/58967 | A1 | 10/2000 |
| WO | 00/59214 | A1 | 10/2000 |
| WO | 00/62298 | A1 | 10/2000 |
| WO | 00/62299 | A1 | 10/2000 |
| WO | 00/62533 | A1 | 10/2000 |
| WO | 00/67475 | A1 | 11/2000 |
| WO | 01/06370 | A1 | 1/2001 |
| WO | 01/22729 | A1 | 3/2001 |
| WO | 01/46843 | A2 | 6/2001 |
| WO | 01/47238 | A2 | 6/2001 |
| WO | 01/47249 | A2 | 6/2001 |
| WO | 01/47279 | A2 | 6/2001 |
| WO | 01/65762 | A2 | 9/2001 |
| WO | 01/65862 | A2 | 9/2001 |
| WO | WO 01/76249 | A1 | 10/2001 |
| WO | 01/89203 | A2 | 11/2001 |

OTHER PUBLICATIONS

International Search Report, PCT/US04/08632, dated May 15, 2007.
International Search Report and Written Opinion, PCT/US04/08891, dated Jul. 25, 2008.

* cited by examiner

| The Young and the Restless | | |
|---|---|---|
| 11:00 am - 12:00 pm; 45 minutes, in progress. | | |
| Wed 10/18 | 11:30 am | 12:00 pm | 12:30 pm |
| 5 KPIX | The Young and the Restless | Channel 5 Eye on ... | The Bold and the ... |
| 7 KGO | ABC News | All My Children | |
| 9 KQED | Reading ... | Animal ... | Charlie Rose | |
| 11 KNTV | Extra | Mid Day About Town | Inside Edition |
| 14 KDTV | DKDA | | |
| 20 KBWB | Jerry Springer | Divorce Court | Power of Attorney |

Fig. 7A

| Wed 10/18 | 11:30 am | 12:00 pm | 12:30 pm |
|---|---|---|---|
| 5 KPIX | The Young and the Restless | Channel 5 Eye on ... | The Bold and the ... |
| 7 KGO | ABC News | All My Children | |
| 9 KQED | Reading ... | Charlie Rose | |
| | Animal ... | | |
| 11 KNTV | Extra | Mid Day About Town | Inside Edition |
| 14 KDTV | DKDA | | |
| 20 KBWB | Jerry Springer | Divorce Court | Power of Attorney |

The Young and the Restless — KPIX Air 5

11:00 am - 12:00 pm; 45 minutes, in progress.

Fig. 7B

INTERFACE FOR RESOLVING RECORDING CONFLICTS WITH NETWORK DEVICES

CROSS REFERENCE TO RELATED APPLICATIONS

This application claims priority under 35 U.S.C. §119(e) to U.S. Provisional Application No. 60/313,546, filed Aug. 19, 2001, and entitled Recording Conflict Resolver, which is incorporated by reference herein in its entirety.

This application is related to application Ser. No. 10/215,904, filed on Aug. 9, 2002 and entitled "Network Video Unit", application Ser. No. 10/124,190 filed on Apr. 16, 2002 and entitled "Accessing Programs Using Networked Digital Recording Devices", application Ser. No. 10/124,506, filed on Apr. 16, 2002 and entitled "Improved Guide Content Management", and application Ser. No. 10/124,583, filed on Apr. 16, 2002 and entitled "Methods and Apparatus for Sending Content between Client Devices", each of which is incorporated by reference herein in its entirety.

BACKGROUND OF THE INVENTION

1. Field of the Invention

This invention relates generally to content recording, and more particularly to resolving conflicts where recording is requested for concurrently provided programs.

2. Description of the Related Art

Devices such as Personal Video Recorders and Digital Video Recorders allow broadcast content to be recorded for subsequent playback and other operations. With these devices, a user may navigate a channel guide that lists programs that are currently being broadcasted or that will be broadcasted in the future. The user may select programs from these listings for recording. The devices then schedule the program for recording, and when the program is broadcast, record the program such as by storing files corresponding to the program on a hard disk.

The ever-increasing array of channels available to users in broadcast systems makes it difficult for the user to manage content that will be recorded. In particular, a user may navigate to a program being shown at a particular time, may select the show for recording, but may not realize that the time that the program will be broadcast conflicts with that of another program that had previously been selected for recording. In response to this scenario, previous systems have merely informed the user that a conflict exists, but have done nothing further to help the user resolve the conflict. This frustrates users, as they must independently navigate among programs to attempt to resolve the conflict, and then re-select the new program for recording should they desire.

Compounding the above problem is the provision of a "repeat recording" feature in certain systems. A repeat recording may be invoked for a set or series of programs. For example, a user may elect to "repeat record" a television program belonging to a periodically broadcast series. Specifically, a user may elect to repeat record the television program "Friends," which will cause the program to be recorded whenever it is broadcast in a given timeslot on a given channel. Whether a repeat recording is previously scheduled, or newly requested, the existence of multiple instances of scheduled recordings complicates conflict resolution as a user might like to retain portions of repeat record schedules that are not subject to conflicts.

What is needed is recording conflict resolution that immediately informs the user of a conflict in detailed fashion, that provides interfaces for immediately resolving the conflict without cumbersome and unguided navigation among scheduled recordings, and that accounts for and resolves conflicts involving repeat recordings.

SUMMARY OF THE INVENTION

The described embodiments of the present invention detect potential recording conflicts, produce interfaces that allow improved resolution of conflicts, and provide improved procedures for resolving conflicts and managing the recording of programs. Although at least some embodiments of the invention are described in connection with a digital video recorder unit, which allows a user to select and record video content, the invention is not intended to be limited to those types of devices.

In one aspect, described embodiments of the invention receive a request for recording a new program, examine recording schedules to determine whether the request to record the new program would conflict with any previously scheduled recording, and automatically provide a display that illustrates and allows resolution of the conflict. For example, such a display may identify the new and previously scheduled programs as well as their recording dates and times, illustrating the conflict. The display may further provide an interface for allowing the user to select either the previously scheduled program or the new program for recording.

In another aspect, described embodiments of the invention maintain a recording queue and an exception list that provide efficient identification of conflicts and management of scheduled recordings. The recording queue includes entries corresponding to each program that is scheduled for recording. If there is a chronological overlap between two scheduled program recordings, then a conflict exists. An exception list identifies each conflict in the recording queue, as well as which of the conflicting programs are respectively favored and preempted for actual recording. Generally, when a program in the recording queue is broadcast, it is recorded. However, where a conflict is found the program is not recorded if the exception list indicates that it is preempted. When a request to record a new program is received, the start and end times of its intended recording can be compared to entries in the recording queue to determine whether the recording request overlaps with any previously scheduled record. If so, conflict resolution displays such as those described above may be provided, wherein the user may, among other things, indicate that they want to record the new program despite the conflict. In that instance, the new program is added to the recording queue but the previously scheduled program is not necessarily removed from the recording queue. Rather, an entry for the previously scheduled recording may remain in the recording queue, but an entry for the conflict is added to the exception list, along with indication that the previously scheduled program is preempted and the newly scheduled program is favored. When the time to record these programs arises, there will be no remaining actual conflict as the recording device will see the previously scheduled program in the recording queue, but will not seek to record it because the exception list indicates that it is preempted.

This aspect of the invention is useful for ongoing management of conflicts. Continuing with the above-described example, if the confirmed recording request for the new program is later cancelled, it is removed from the recording queue, the conflict is removed from the exception list, and the continued presence of the previously scheduled program in the recording queue allows it to be actually recorded.

This aspect is also useful for managing conflicts relating to repeat recordings. For example, a previously scheduled "repeat record" program may have numerous entries in the recording queue, with only one instance (or any subset) potentially conflicting with a request to record a new program. If the request for the new program is confirmed, the recording queue entries corresponding to the repeat record may remain intact, with only actual instances of conflicts being added to the exception list. In this scenario, if the new program is later cancelled, the repeat record can be fully restored.

In still another aspect, the present invention allows channel guides to illustrate the difference between deferred or postponed recordings and preferred or favored recordings. In one embodiment, a channel guide visually indicates those programs that will be recorded, and provides further indication of those programs that have been preempted from recording. For example, the visual indicator of a scheduled record may be a bullet or circle in an entry in the channel guide, and a preempted record may have a similar visual indicator that is grayed out or shown in a different color from that of the scheduled record. This allows the user to very easily observe the effects of conflicts. Additionally, the user may easily navigate to and reinstate a preempted recording because of the visual indicator.

BRIEF DESCRIPTION OF THE DRAWINGS

These and other more detailed and specific features of the present invention are more fully disclosed in the following specification, reference being had to the accompanying drawings, in which:

FIGS. 7A and 7B are graphical diagrams illustrating examples of channel guide displays including visual indicators of recordings and recording conflicts in accordance with the present invention.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
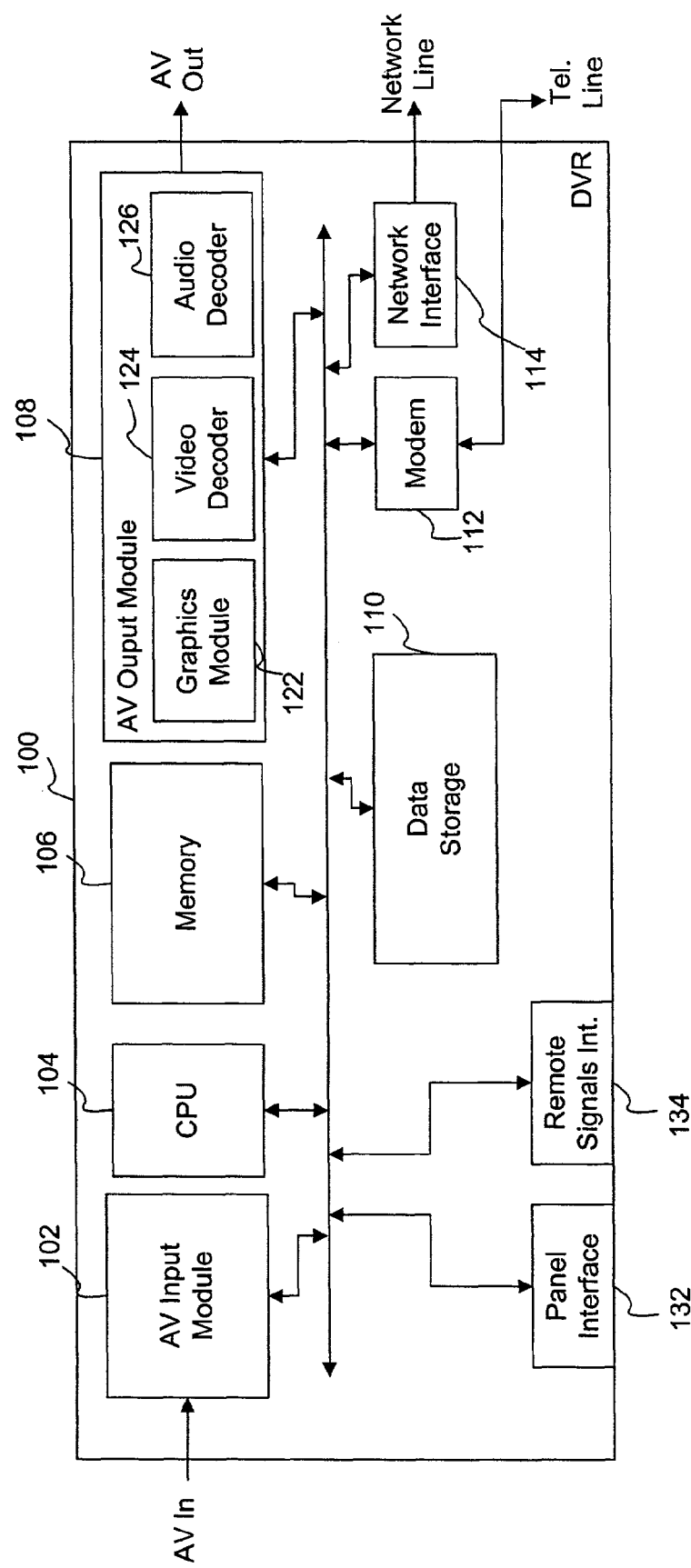
FIG. 1 is a block diagram of a digital video recorder (DVR) that may embody or include embodiments for resolving programming conflicts in accordance with the present invention.

The block diagram of FIG. 1 illustrates a DVR 100 that may incorporate methods and apparatus for resolving recording conflicts in accordance with the present invention. The DVR 100 includes an AV input module 102, CPU 104, memory 106, AV Output module 108, data storage medium 110, modem 112 and network interface 114 interconnected by a conventional bus architecture. Generally, the CPU 104 executes instructions such as those stored in memory 108 to provide functionality including that provided by certain embodiments of the present invention. Additional memory such as ROM and/or EEPROM (not shown) may store instructions for boot up sequences, DVR functionality updates, or other information. The network interface 114 is conventional and may, for example, allow connection to an Ethernet based network. This connection may be used to connect to a home network and in turn a broadband connection to a WAN such as the Internet or any of various alternative broadband connections. In addition to traditional broadcast and other input AV signals, the broadband connection may also source content that is shown and recorded in accordance with the present invention.

The user may control the operation of the DVR 100 through control signals provided on the exterior of the DVR 100 housing through the panel interface 132, or through control signals originating from a remote control, which are received through the remote signals interface 134, in conventional fashion.

The AV input module 102 receives input through various conventional interfaces, including coaxial RF/Ant, S-Video, network interfaces, and others, which need not be shown for an understanding of this invention. The received signals can originate from standard NTSC broadcast, high definition (HDTV) broadcast, standard cable, digital cable, satellite, Internet, or other sources, with the AV input module 102 being configured to include appropriate conventional tuning and/or decoding functionality. The DVR 100 may also receive input from other intermediary devices, such as a set top box that receives one signal format and outputs an NTSC signal or some other conventional format.

The AV input module 102 also preferably includes one or more MPEG encoding modules that convert signals from a first format (e.g. analog NTSC format) into an MPEG format (e.g. MPEG 2, etc.) that may be stored in the memory 108 or data storage medium 110 such as a hard disk. Where necessary, an inbound signal may be converted to an intermediate format prior to MPEG encoding. For example, a digital signal may be intermediately converted to an NTSC signal that is ultimately MPEG encoded. The artisan will recognize the alternatives. Typically, content corresponding to the formatted data stored in the data storage medium 110 may be viewed immediately, or at a later time. Additional information may be stored in association with the MPEG data to manage and identify the stored programs.

The AV output module 108 further illustrates a graphics module 122, video decoder 124 and audio decoder 126. The video decoder 124 and audio decoder 126 are preferably MPEG decoders that can obtain the MPEG data stored in the data storage medium 110 and convert it to format compatible with the display device, typically the NTSC format that can be readily received by a conventional television set. The graphics module 122 receives various guide and control information and provides signals for corresponding displays, outputting them in a compatible format.

The DVR 100 processes guide information that describes and allows navigation among content receivable by a system (e.g. the broadcast system) at present or future times, as well as content that has already been captured by the DVR 100. Guides that display such information may generally be referred to as content guides. These content guides include channel guides and playback guides. A channel guide displays available content from which individual pieces of content may be selected for current or future recording and viewing. In a specific case, the channel guide may list numerous broadcast television programs, and the user may select one or more of the programs for recording. The playback guide displays content that is stored or immediately storable by the DVR 100. Other terminology may be used for the guides. For example, they may be referred to as programming guides or the like. The term content guide is intended to cover all of these alternatives.

The programs that can be listed in the content guide extend beyond familiar television programs that are broadcast by television and cable television networks. For example, programs also include recordings of home videos, home photographs, duplicated versions of content previously purchased by a user in another form (e.g. a movie on a video cassette), or any content that can be recorded by the unit and which is then displayable as a "program" in the content guide.

The DVR 100 may also be referred to as a Personal Video Recorder (PVR). One example of a DVR 100 that may incorporate embodiments of the present invention is the ReplayTV® brand of DVRs provided by SONICblue® Incorporated, a Santa Clara, Calif. company. A Replay Guide is an example of a playback guide implemented by ReplayTV® DVRs.

Although certain modular components of a DVR 100 are shown in FIG. 1, the present invention also contemplates and encompasses units having different features. For example, some devices may omit features such as the telephone line modem, instead using alternative conduits to acquire guide data or other information that may be used in practicing the present invention. Additionally, some devices may add features such as a conditional access module (CAM), such as one implementing smart card technology, which may work in conjunction with certain content providers and/or broadcasters of content.

Additionally, although this embodiment and other embodiments of the present invention are described in connection with a DVR or PVR, the invention is equally applicable to other devices including but not limited to a set top box (STB), cable STB, satellite STB, or televisions containing modules with similar functionality.

Figure 2:
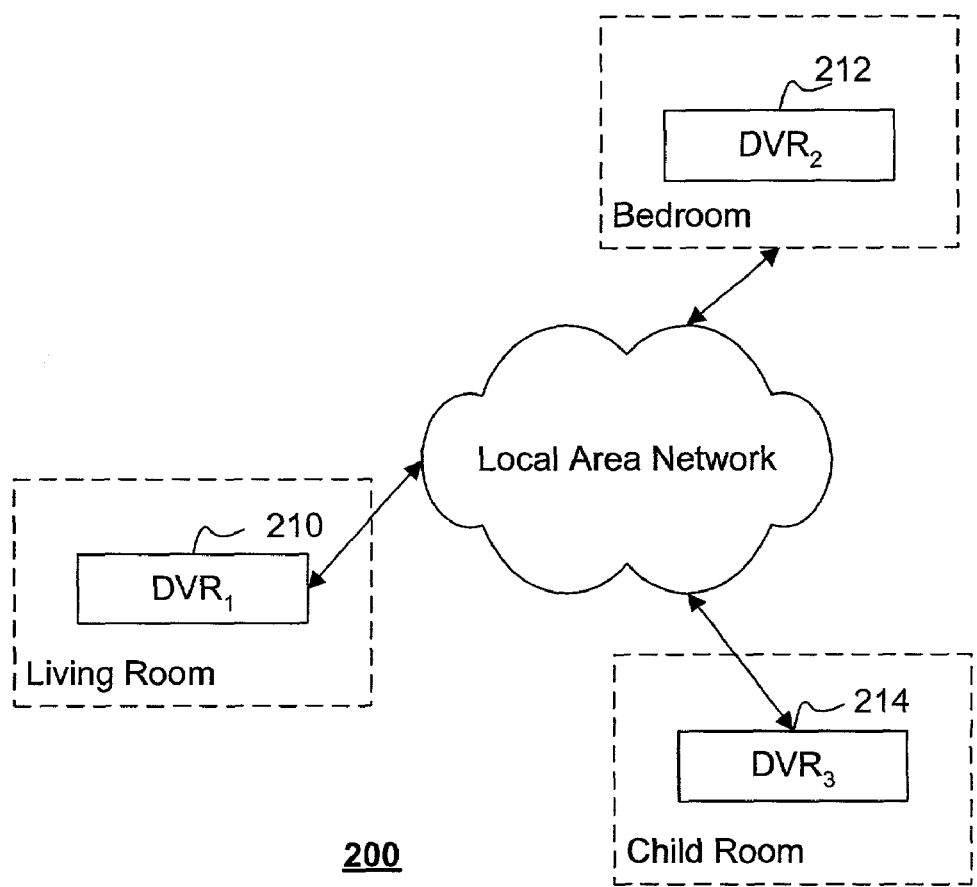
FIGS. 2 and 3 are schematic diagrams illustrating examples of systems in which a DVR may operate.

The DVR 100 may operate as a single home unit that is used in conjunction with a conventional television set, and that does not necessitate communication with other units. Alternatively, the DVR 100 may operate along with other units in various types of networks or the like. FIG. 2 illustrates an example of a system 200 in which several DVRs 210-214 are interconnected in a local area network. Particularly, a home network is shown to include a living room $DVR_1$ 210, a bedroom $DVR_2$ 212 and a child room $DVR_3$ 214. Conventional network technology and software may be used to generally allow the units to communicate with each other, such as through the above described network interface. The network arrangement allows certain remote operations and interchanges between units, and may also provide a conduit through which programming is provided to the units. Particularly, for example, a bedroom $DVR_2$ 212 may connect to a living room $DVR_1$ 210 through the network to view its content guide. This functionality is described further in the aforementioned commonly assigned patent application Ser. No. 10/124,190, filed on Apr. 16, 2002 and entitled "Accessing Programs Using Networked Digital Video Recording Devices."

Figure 3:
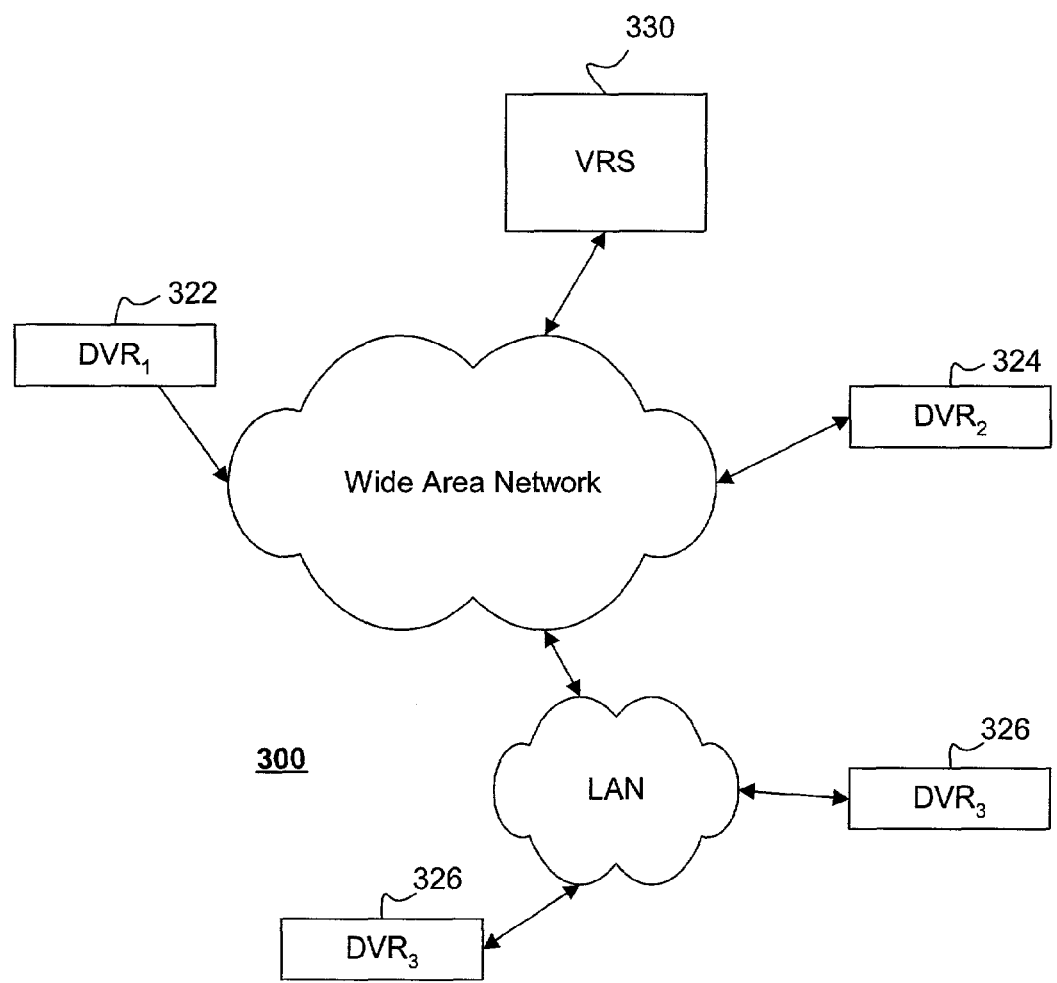

FIG. 3 illustrates another example of a system 300 in which several DVRs 322-328 are variously connected to a LAN and a wide area network (WAN), such as the Internet. Particularly, a DVR3 326 and another DVR4 328 are shown connected to a LAN, such as that described in connection with FIG. 2. The units in the LAN may in turn be connected to the WAN, so that they can communicate with other DVRs 322, 324 or a server 330. Again, conventional networking technologies may be used to facilitate the communications among the units. For example, the network communications may implement the Transmission Control Protocol/Internet Protocol (TCP/IP), and additional conventional higher-level protocols, such as the Hyper Text Transfer Protocol (HTTP) or File Transfer Protocol (FTP).

Figure 4:
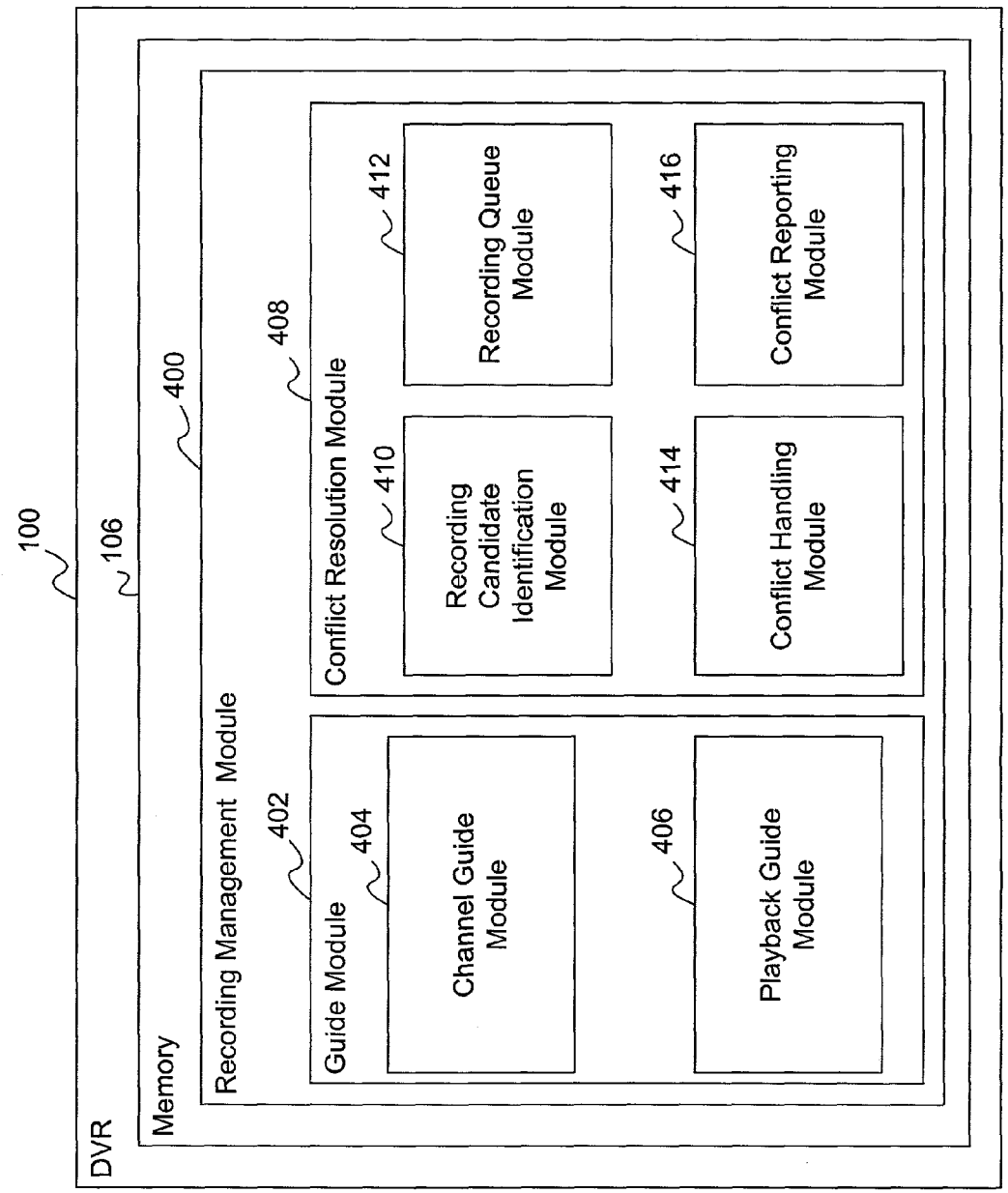
FIG. 4 is a block diagram illustrating a recording management module configured in accordance with an embodiment of the present invention.

The block diagram of FIG. 4 illustrates an embodiment of a recording management module 400 within a DVR 100 memory 106. The memory 106 includes a conventional engine (not shown) that provides the necessary framework and APIs on which applications and other software will operate. Although any conventional software may be supported, preferably the engine will support Extensible Markup Language (XML), and/or Hypertext Markup Language (HTML) applications and modules.

Preferably, the functionality for resolving recording conflicts described in connection with the present invention is provided by software, although such functionality may also be provided by hardware, firmware, or any combination thereof. Although the software may be variously modularized, such as by providing more or less software modules to provide the same overall functionality, FIG. 4 illustrates an example of a recording management module 400 to include a content guide module 402 including a channel guide module 404 and a playback guide module 406, and a conflict resolution module 408 including a recording candidate identifying module 410, a recording queue module 412, a conflict handling module 414, and a conflict reporting module 416. The guide module 402 includes routines for managing the display of the various guides. Further, the channel guide module 404 and the playback guide module 406 include routines for respectively managing the display of the previously introduced channel guides and playback guides, such as a Replay Guide.

The conflict resolution module 408 automatically identifies conflicts and reports them to users for resolution, through the routines contained or referenced therein. The recording candidate identifying module 410 includes routines for identifying programs that are candidates for recording. For example, a user may specifically identify an instance of a program for recording ("a single recording"), or a user may identify a periodically shown program for "repeat recording." Additionally, routines may automatically identify programs for recording based upon input provided by the user, which may be referred to as "theme" based recording. For example, a user may specify a desire for any programs that include "Action" and the actor "Arnold Schwarzennegger" and the routines will identify any programs (television shows, movies, etc.) satisfying the criteria as candidates for recording.

The recording queue module 412 includes an array or queue of all programs currently slated for recording, preferably in sorted in chronological order. Each scheduled recording has an entry that identifies the program to be recorded as well as a time to start recording the program (start time) and a time to end recording the program (end time). Alternative sequences or listings may be provided, preferably with a field indicating the time of recording. In addition to a recording queue, the recording queue module 412 maintains an exception list. The exception list identifies conflicts found in the recording queue. Conflicts are determined where the start time for one scheduled record chronologically precedes an end time for another scheduled record. For each conflict, it also identifies which program is favored or retained for recording, and which program is deferred or preempted from recording.

The conflict handling module 414 includes routines for identifying conflicting recordings and for managing the recording queue and exception list to resolve those conflicts, and the conflict reporting module 416 includes routines for reporting conflicting recordings to the user, and seeking resolution of the conflict.

Preferably, the conflict handling module 414 communicates with the recording candidate identification module 410, the recording queue module 412 and the conflict reporting module 416 to carry out this functionality. Particularly, when a program is identified as a candidate for recording, such as by user input, the conflict handling module 414 identifies the program and receives information about the program, such as the time that it will be broadcast. The conflict handling module 414 then examines the contents of the recording queue to determine whether there is an entry having a recording time that conflicts with that of the current candidate. If such an entry is found, the conflict handling module 414 passes the information to the conflict reporting module 416, which automatically provides a display to the user indicating the existence of the conflict, the previously scheduled program and time, and the new candidate for recording (program and time as well), and receives input from the user, such as an indication to record the previously scheduled program, or an indication to record the new program in lieu of the previously scheduled one.

The conflict handling module 414 receives the indication of which program to record, and applies a conflict handling routine to update the recording queue and exception list as needed. The functionality of automatically identifying conflicting program recordings, displaying conflict information, and resolving the conflict are described further in connection with the following diagrams.

In one aspect, an embodiment of the present invention automatically informs a user of a recording conflict upon its detection, and provides a user interface for resolving the conflict. This embodiment is now described in further detail with reference to FIGS. 5A, 5B and 6. As described previously, a user may provide conventional input to a DVR to request the recording of a program. For example, the user may navigate among entries in a channel guide, which illustrates listings of programs and the times that they will be broadcast. Such navigation may be by a conventional cursor or highlight and corresponding remote control functions, such as arrows that prompt navigation in the referenced directions. The user may elect to record a program shown in the channel guide. For example, while the cursor is over a given program, the user may press a "RECORD" button that automatically seeks to queue the noted program for recording. This may cause a visual indication to appear along with the entry for the program in the channel guide, such as a colored circle. A user may also invoke "repeat recording" for a program by pressing the RECORD button twice within a given time frame, or via other conventional control signals. This also may prompt a visual indication within the entry for the program, such as two overlapping colored circles.

Figure 5A:
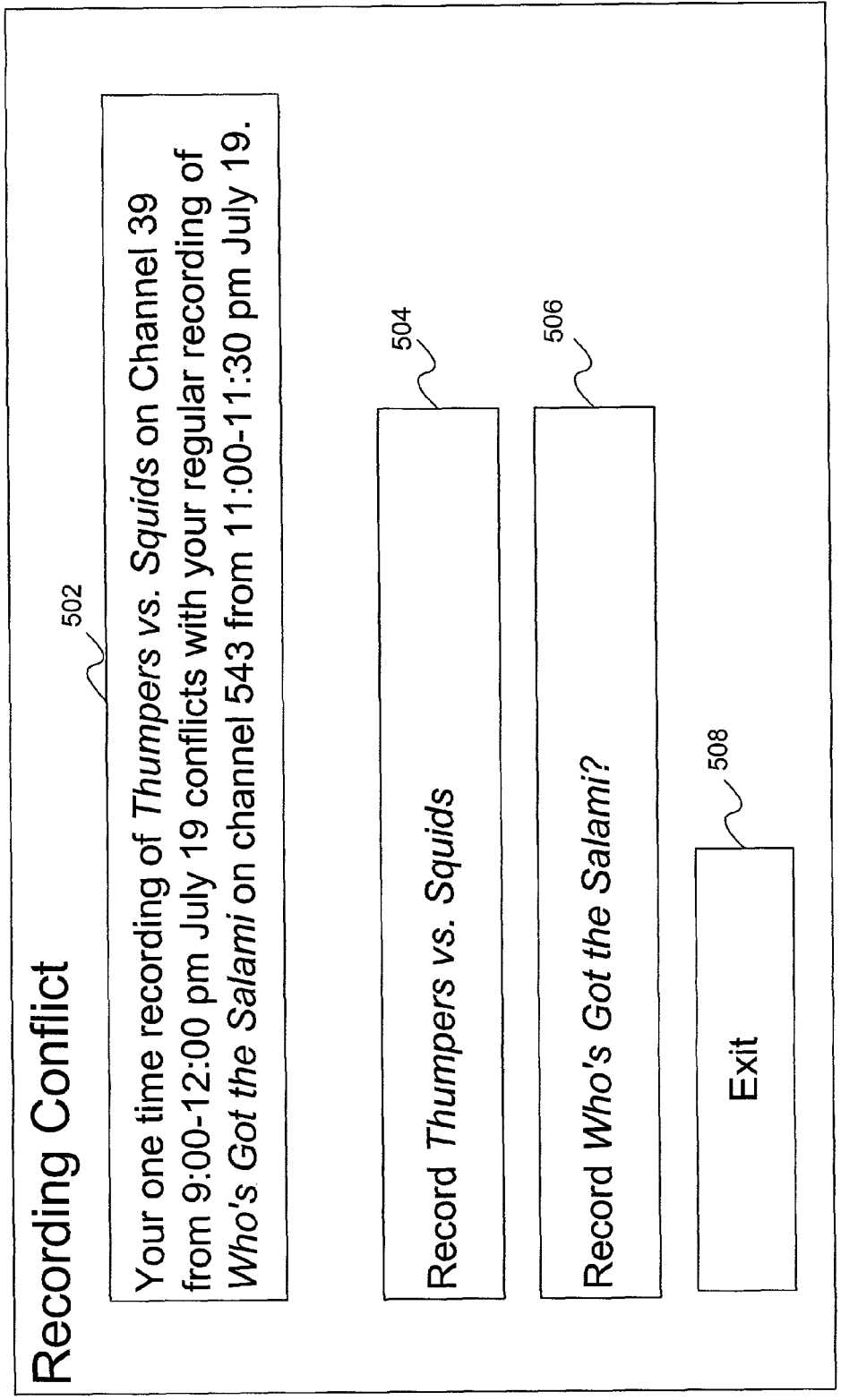
FIGS. 5A and 5B are graphical diagrams illustrating examples of displays for resolving conflicts in accordance with the present invention.
Figure 6:
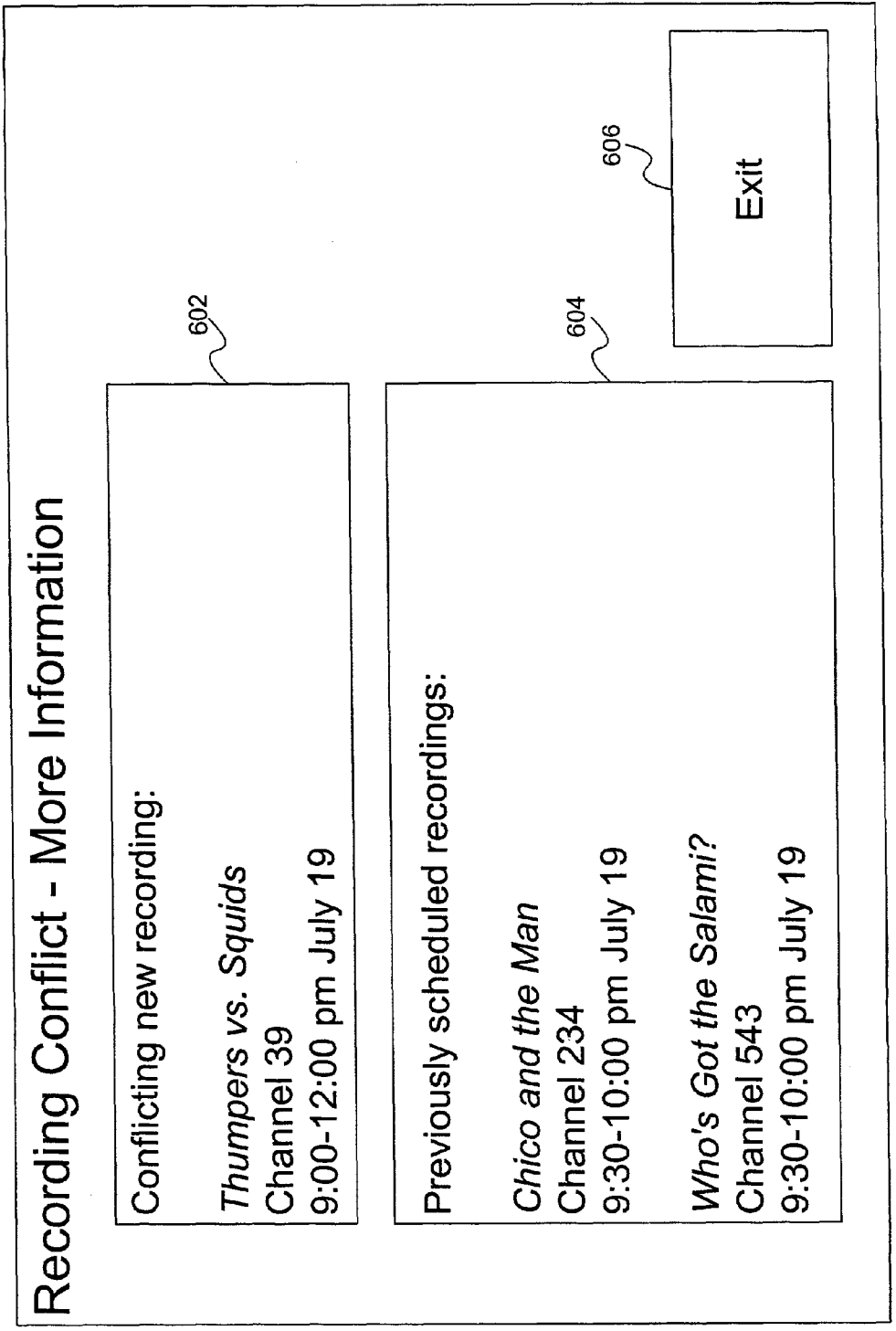
FIG. 6 is a graphical diagram illustrating an example of providing more information about an identified conflict, that works in conjunction with the graphical diagram of FIG. 5B.

Regardless of how the request for recording is made, in accordance with this aspect of the present invention, any conflicting previously scheduled recording is identified, and an interface is provided to enable the selection of either the previously scheduled recording or the newly requested recording, such as the example of the conflict resolution display 500a illustrated in FIG. 5A, which includes a display region 502 describing the recording conflict, a button 504 that allows election of the previously scheduled recording, a button 506 for election of the newly requested recording, and an exit button 508. Particularly, the recording conflict display region 502 includes a textual message that identifies the conflict. Preferably, at least the program title and recording time for both the scheduled recording and the new selection are provided. The message may also indicate whether the existing (and the new) recording selections are single (which may also be referred to as "one time") records or repeat records. Selection of the button 504 for the newly requested recording updates the recording queue and recording exceptions list to record the new program in favor of the previously scheduled program. A process for identifying conflicts and updating the queue is described in further detail in the description of FIGS. 8A-8C, below. Selection of the button 504 for the previously scheduled recording retains the status quo for the recording queue and exception list. Pressing the exit button 508 essentially retains the previously scheduled recording as well, but it can nonetheless be provided for user comfort.

Figure 5B:
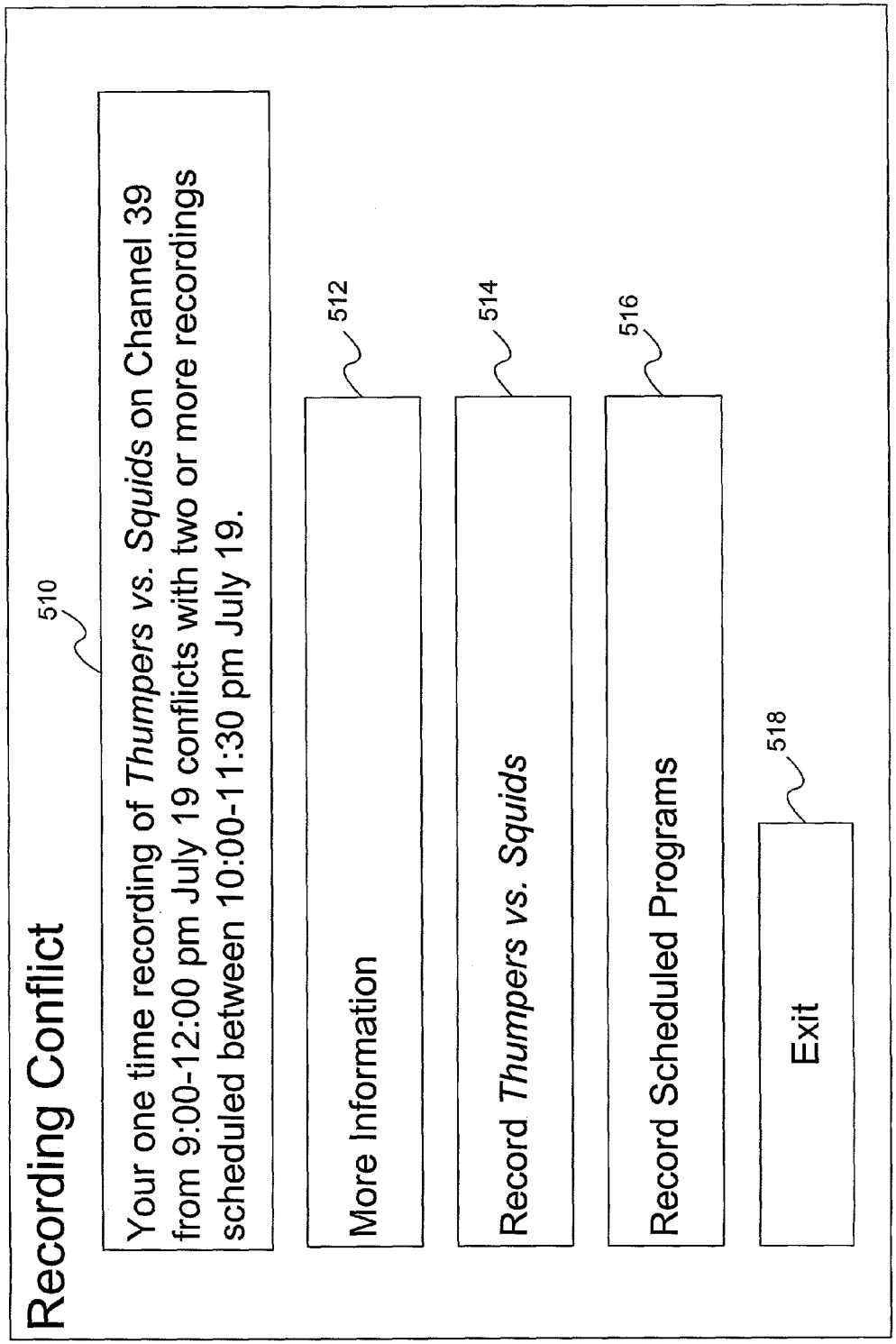

There may be more than one previously scheduled recording in conflict with the new request. Although all of the information regarding the programs involved in such a conflict may be displayed concurrently, FIG. 5B illustrates another example of a conflicts resolution display 500b that introduces the conflict without initially overloading the user with information. Particularly, the display 500b includes a display region 510 that describes the recording conflict, preferably in text or graphics, as well as a button 512 to select the newly requested program for recording, a button 514 generally allowing selection of the previously scheduled programs, and an exit button 516 that perform similarly to the analogous buttons in display 500a. However, a "more information" button 518 may be selected to acquire more detailed information about the recording conflict, such as in a display 600 illustrated in FIG. 6. Particularly, the display 600 includes a panel 602 that identifies and describes the conflicting new recording, and a panel 604 that does the same for the previously scheduled recordings. Preferably, the information will include the program title, date, broadcast time and duration, channel number and status (e.g., new or repeat program, rating information, etc.). Pressing the exit button 606 closes the more informative display 600 and returns to the conflict resolution display 500b from which the ultimate selection may be made.

Accordingly, when a user has selected a program for recording that conflicts with any previously scheduled recording, that conflict is automatically identified and a display allowing immediate resolution of the conflict is generated.

In another aspect, the present invention updates a channel guide display to reflect elections pursuant to resolution of a conflict, and allows a deferred recording to be easily reactivated. The diagrams of FIGS. 7A and 7B illustrate examples of channel guide displays 700a, 700b in accordance with this aspect of the present invention. Particularly, the channel guide display 700a of FIG. 7A includes a heads up display (HUD) region including a header region 702a, and a main HUD region 702b. The guide display 700a further includes date 706 and time 708a-c headings, as well as several rows or entries 710*a-f*. For each entry, the channel number is shown in the column beneath the date heading 706. Each time heading 708*a-c* corresponds to a designated time block. For example, the blocks in columns under time heading 708*a* indicate programming available between 11:30 am-12:00 pm, those under heading 708*b* indicate programming between 12:00 pm-12:30 pm and those under heading 708*c* programming between 12:30 pm-1:00 pm. The user may use conventional remote control signals, such as arrows, to navigate among available entries. This navigation may include time blocks that are not shown in FIG. 7A, such as by moving the cursor towards the right side of the screen. This causes the blocks of time in columns 708*a-c*, and the underlying programs to update. When the cursor resides over a particular program, the user may elect to record the particular program. For example, while the cursor resides over the entry for "Charlie Rose" as indicated in row 710*c*, the user may hit the "record" button on their remote control, to automatically schedule the program for recording, and to automatically cause a symbol, such as a highlighted circle 714 to appear next to the entry. A repeat recording may be prompted by pressing the record button twice, and will be also be indicated by a symbol such as a double circle. If a conflict is detected, then it can be announced and resolved as described above. A scheduled recording that has been deferred in favor of a subsequently selected program may be indicated by providing a different symbol or by altering the existing symbol. Thus, with reference to FIG. 7A, if the "Charlie Rose" program of row 710*c* is selected and confirmed for recording subsequent to a repeat recording selection for the "All My Children" of row 710*b*, then the recording symbol corresponding to the conflicting instance of the program may be altered to reflect that it is deferred. FIG. 7A depicts a double circle 712 in dashed lines to reflect this. Other schemes, such as "graying" from the record color, or using a separate color may be used to depict programs whose recording has been preempted by selection of another conflicting program.

Referring to FIG. 7B, if a preempted recording is reinstated, such as by canceling the preempting recording or re-selecting the preempted program for recording, the symbol may be reinstated to reflect the same, as shown in the channel guide display 700*b*. Particularly, if the scheduled record for the "Charlie Rose" program is cancelled the symbol 716 for the "All My Children" program is depicted with solid lines.

Figure 8A:
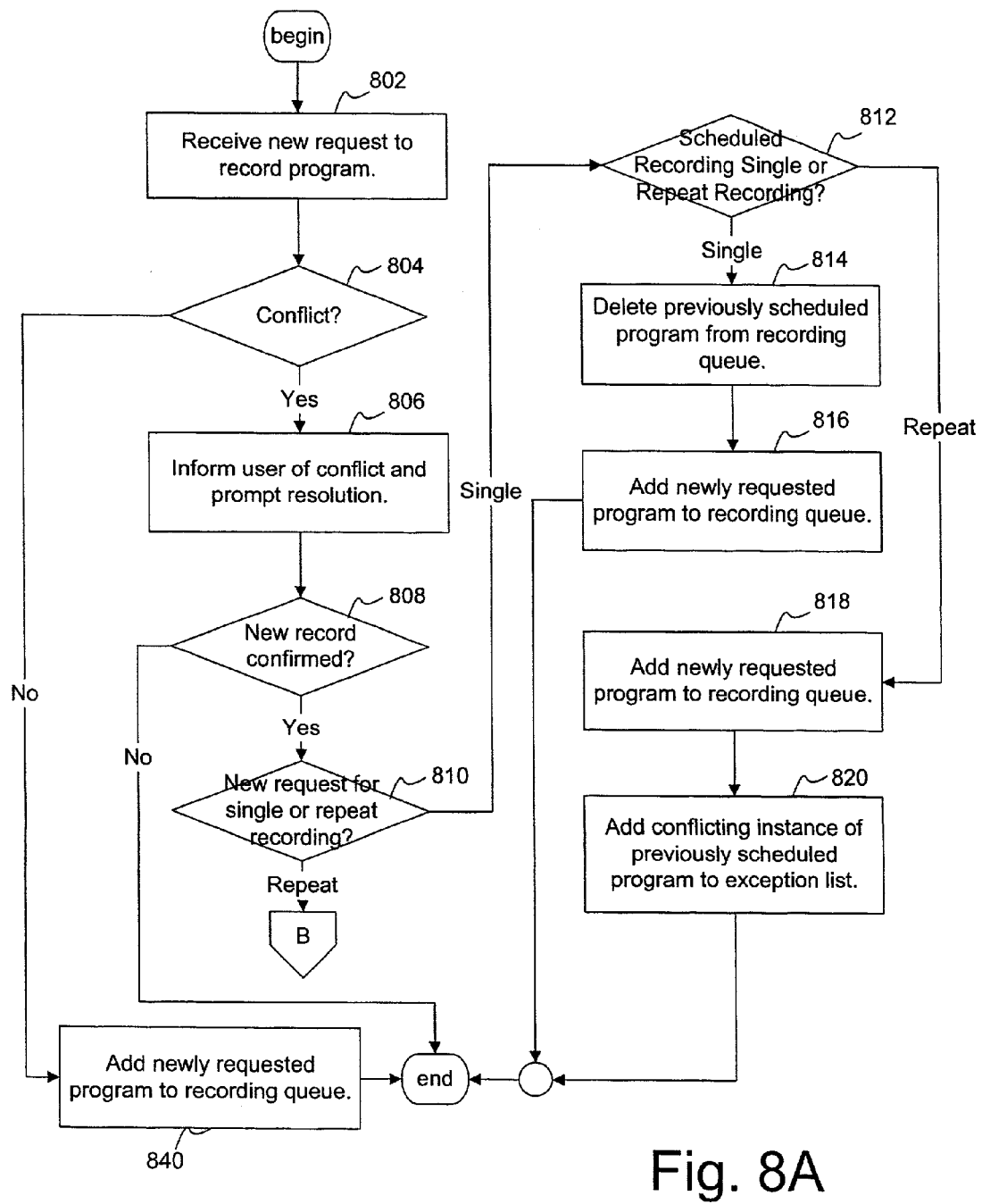
FIGS. 8A-8C are flow diagrams illustrating an embodiment of resolving conflicts in accordance with the present invention.

The underlying functionality of queuing recordings and maintaining exceptions to queued recordings is now further described with reference to the flow diagrams of FIGS. 8A-C. Referring first to FIG. 8A, initially, a new request to record a program is received (802), such as through the interfaces described above, whereupon it is determined (804) whether a conflict exists.

One technique for determining whether a conflict exists implements the previously introduced recording queue. Generally, the recording queue contains all of the programs currently scheduled for recording (and possibly including some that are currently preempted from being recorded, as discussed below). Each entry in the recording queue contains information to identify the program to be recorded and to schedule the recording of programs. Preferably, the information includes a program identifier, an identification of the channel, and the recording date and time period (start, end). Additionally, information describing why the program was placed in the recording queue, such as whether the program is a theme based recording, and possibly the underlying theme criteria, and whether the program is a single record or a repeat record, may also be provided. The recording queue is also refreshed periodically to obtain new recordings that satisfy previously entered theme or repeat recording requests. This allows the recording queue to be updated to include additional entries corresponding to a periodic guide data update.

The information concerning a newly selected candidate for recording, and the information in the recording queue are used to determine (804) the conflict. Specifically, when the request to record a program is received, information about the program is loaded into a buffer. This information includes the recording time period, which may then be compared to the entries in the recording queue to determine whether there is overlap between any recording time period therein and that of the new program. Specifically, the overlap is determined by examining start and stop times, including date, of scheduled records. These times may not coincide exactly with the actually scheduled times of the scheduled programs, particularly where a Replay TV ShowExtender™ mode, which pads the front and back ends of a record to ensure capture of a complete program, is invoked. If the end time of one recording is chronologically between the start and end time of another recording, then it is deemed to conflict.

If there are no overlapping entries it is determined (804) that a conflict does not exist, and an entry for the newly requested program is added (840) to the recording queue. If, however, an overlapping entry exists it is determined (804) that a conflict exists, and the user is automatically informed (816) of the conflict and prompted for resolution of the conflict. Preferably, a display that allows immediate resolution of the conflict as described above is provided. This display can be populated by obtaining the retained information for the newly requested recording and the information in the recording queue for the previously scheduled recording. Particularly, the program title, recording period, date and time may be accessed and displayed, among other things. Additionally, a button may be provided that allows the user to immediately "Keep the Scheduled Recording" or "Record the New Program" (or similar actions using the program titles, etc.). If the user keeps the scheduled recording, it is determined (808) that the new request has not been confirmed, and the recording queue is not updated. If the user selects the new program, then it is determined (808) that the new record is confirmed despite the conflict, and processes for updating the recording queue and an exception list are invoked.

Before describing those procedures, the interoperation of the recording queue and the exception list is described. Generally, all scheduled recordings are retained in the recording queue, as described above. Additionally, each conflicting pair of scheduled recordings is maintained in the exception list. The exception list indicates which of the pair is favored and which pair is preempted. If three scheduled program records (A, B, C) all conflict with each other, then three entries are provided in the exception list (A-B, B-C, A-C). This arrangement improves management of scheduled repeat recordings and allows improved handling of cascaded conflicts. Accordingly, two programs having overlapping broadcast time periods may be retained in the recording queue, but one of them may be included in the exception list. Determining whether to proceed with a record (and rendering the display of scheduled records in a content guide) first looks to the recording queue to identify a program to be recorded, and then looks to the exception list to determine whether a conflicting program is to be deferred or recorded.

A program ("A") whose recording was preempted can be easily reinstated if the preempting recording ("B") is subsequently cancelled. When the preempting recording "B" is cancelled there is no longer a conflict between the recordings "A", "B" in the recording queue. The scheduled record for program "A" remains in the recording queue, and the exception list no longer includes an entry for the previous conflict, so program "A" is effectively reinstated for recording without requiring the user to do so.

Still referring to FIG. 8A, in processing the confirmed request to record the conflicting program, it is first determined (810) whether the new request is for a repeat recording or a single recording. If it is a repeat recording, then the procedures illustrated in FIG. 8B, discussed below are provided. If it is a single recording, then it is determined (812) whether the previously scheduled recording is a single or repeat recording. In this embodiment, if the newly requested program is a single recording and the previously requested program is a single recording, then the previously scheduled program is deleted (814) from the recording queue, and the newly requested program is added (816) to the recording queue. It is not necessary to update the exception list, as it is presumed that the overridden recording will not be reinstated. (It can of course be reinstated manually, by having the user again go through the procedures of identifying it and selecting it for recording).

If the newly requested program is a single recording and the previously scheduled program is a repeat recording, then the newly requested recording is added (818) to the recording queue. However, here the previously scheduled program is not removed from the recording queue. Rather, any conflicting instances of the previously scheduled program are added (820) to the exception list. This retains all of the instances of the previously scheduled program in the recording queue. Any instances that were not affected by the conflict will still be recorded. Any conflicted instances will be in the exception list, and will be reestablished if the newly requested recording is subsequently cancelled.

Figure 8B:
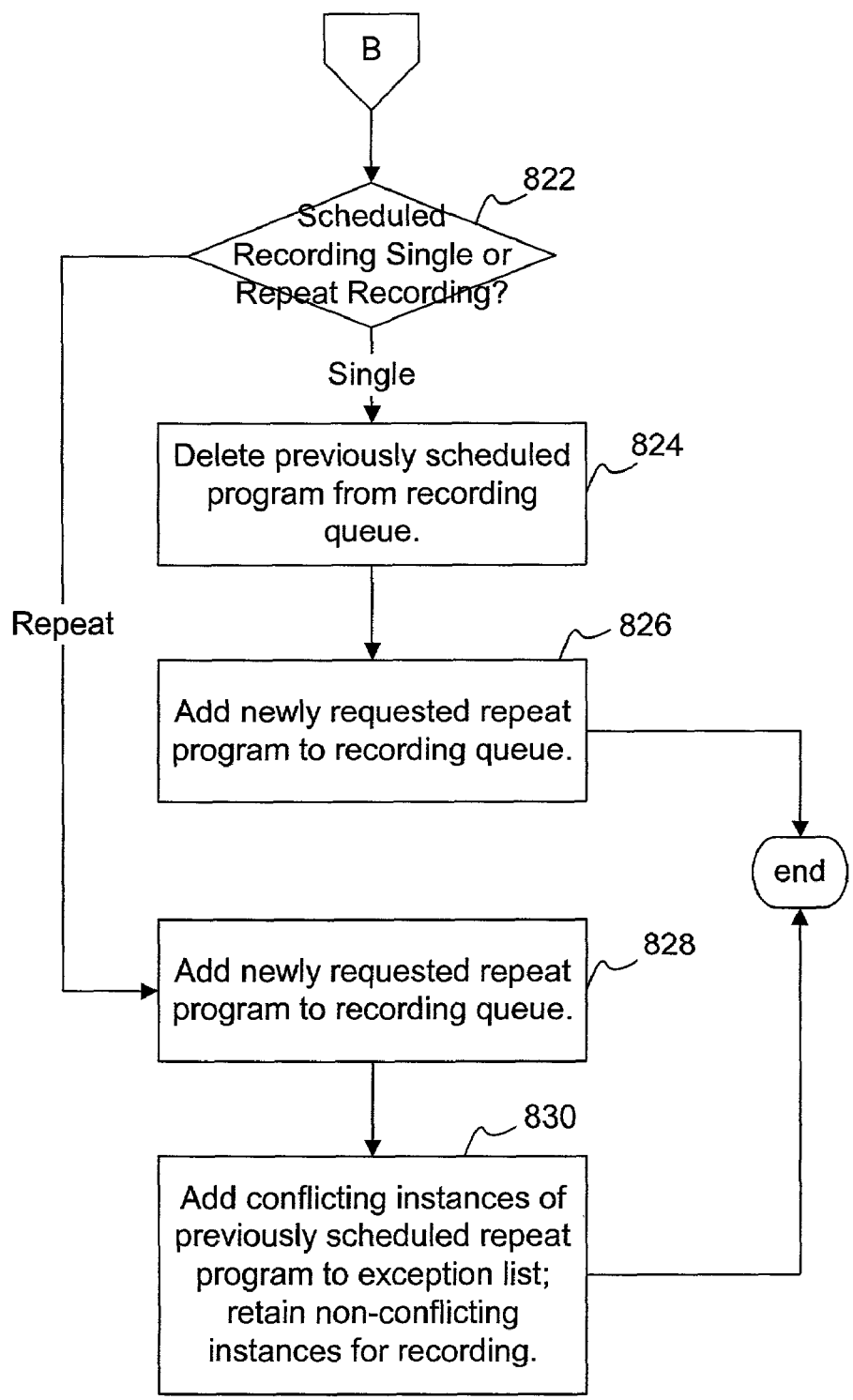

As indicated above, the flow diagram of FIG. 8B illustrates procedures that are implemented where the newly requested recording is a repeat recording. Initially, it is determined (822) whether the previously scheduled program is a single or repeat recording. If it is a single recording, then the previously scheduled program is deleted (824) from the recording queue and the newly requested repeat program is added (826) to the recording queue.

If the previously scheduled program is a repeat recording, then the instances of the newly requested programs for the repeat record are added (828) to the recording queue. Any conflicts with the previously scheduled repeat record are added (830) to the exception list, with the newly requested instances being favored over the previously requested instances for each conflicting pair. Again, the non-conflicted instances of the previously scheduled repeat record will still be recorded, and the conflicted instances can be reinstated if the newly requested repeat record is subsequently cancelled.

The above description of the invention presumes that conflicts will arise if there is a single overlapping instance of a previously scheduled recording and a newly requested recording. There will of course also be embodiments where more than one overlapping instance will be accommodated before the conflicts resolution displays and procedures are invoked. For example, a DVR may be accommodate the recording of two programs simultaneously, such as by including two tuners, and adequate computational overhead to service and record two streams of data concurrently. In such an instance, the conflict resolution procedures would be invoked whenever the system would be incapable of handling all of the recording requests. That is, if two simultaneous record operations can be handled, then the procedures would be invoked when a user requests a third recording that conflicts with previous first and second simultaneous records. In that instance, where a conflict is determined, the first or second program may be referred to as the "first" program, and the third program may be referred to as the "second" program, which conflicts with the first program.

Figure 8C:
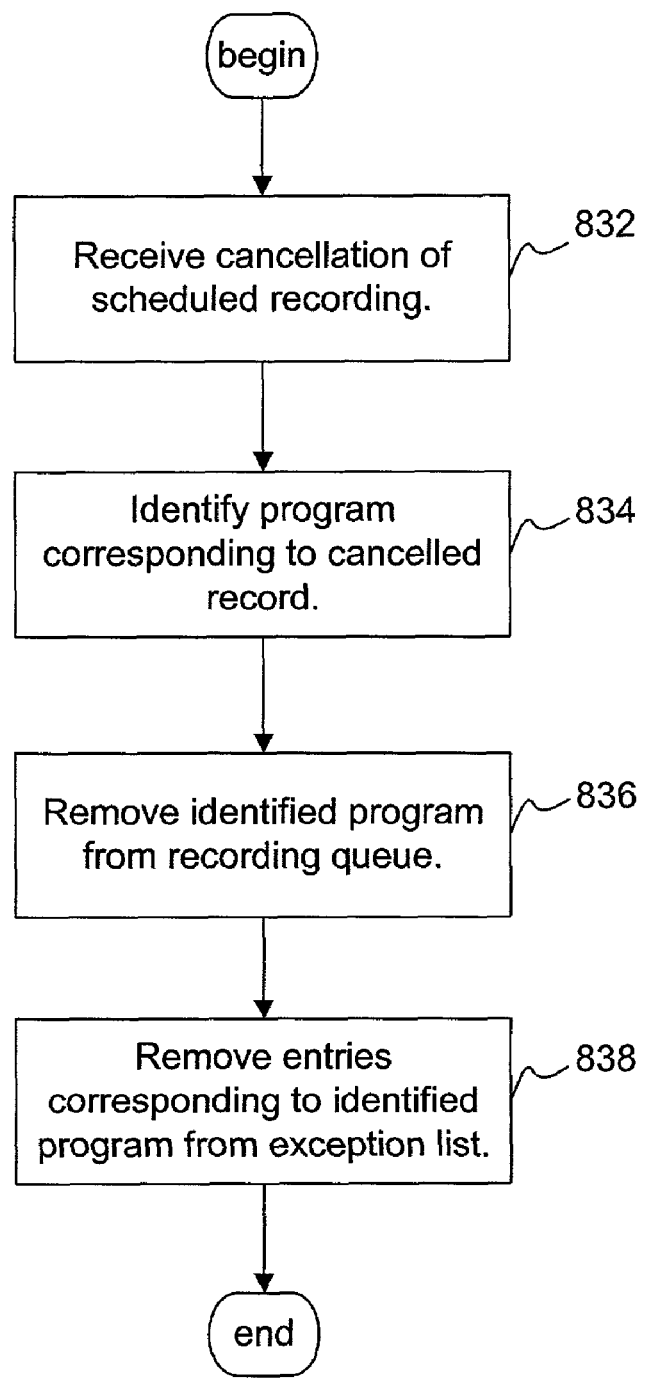

Referring now to the flow diagram of FIG. 8C, once the recording queue and exception list have been established as previously described, identifying programs to be recorded and reinstating programs for recording is rather straightforward. Suppose that a scheduled recording is cancelled. Upon receipt 832 of the cancellation of the recording, the program to be cancelled is identified 834 and may be removed 836 from the recording queue. This removes the conflict or conflicts from the recording queue, and the entry or entries corresponding to the conflicts are removed 838 from the exception list, which effectively reinstates the retained recordings.

An alternative embodiment also extends conflict resolution and scheduling across networked DVRs. Here, it is initially determined whether a recording conflict exists for the individual DVR operated by the user, as described above. Where a recording conflict exists for the unit, a display informs the user regarding the status of the detected conflict with regard to other DVRs in their home network. For example, a user scheduling a record from a first DVR receives a message indicating a conflict on the first DVR, and a message indicating that a second DVR does not have a conflict. The user may then elect to resolve the conflict locally, by electing the new or previously scheduled program as described above, or schedule the record on an alternative, non-conflicting DVR in the network. The initial determination of the conflict looks only to the local unit on which a user is requesting a record. Once a conflict on a first DVR is determined, the DVR can request the recording queues of other DVRs in the network, examine them against the new scheduling request, and determine conflicts as described. The conflict status can then be displayed to the user.

A universal recording queue having the recording queue features described previously, as well as a field that identifies the DVR on which a program is to be recorded, preferably provides the network conflict status to the local DVR. The universal recording queue would be communicated among the available units, or retained at a master unit from which it could be obtained as needed, using conventional network communications technology.

When a user requests a record, the universal recording queue is checked to determine whether the DVR operated by the user has a conflict that is reported to the user along with conflict resolution options implementing other DVRs in the network. Another alternative provides a universal recording queue and corresponding conflicts resolution functionality that seamlessly and transparently uses all of the resources available in the user's home network. Here, a recording request that would ordinarily produce a conflict for the operated DVR automatically invokes the resources of other DVRs in the network to handle the record. Thus, there is no need to report a conflict to the user.

Figure 9:
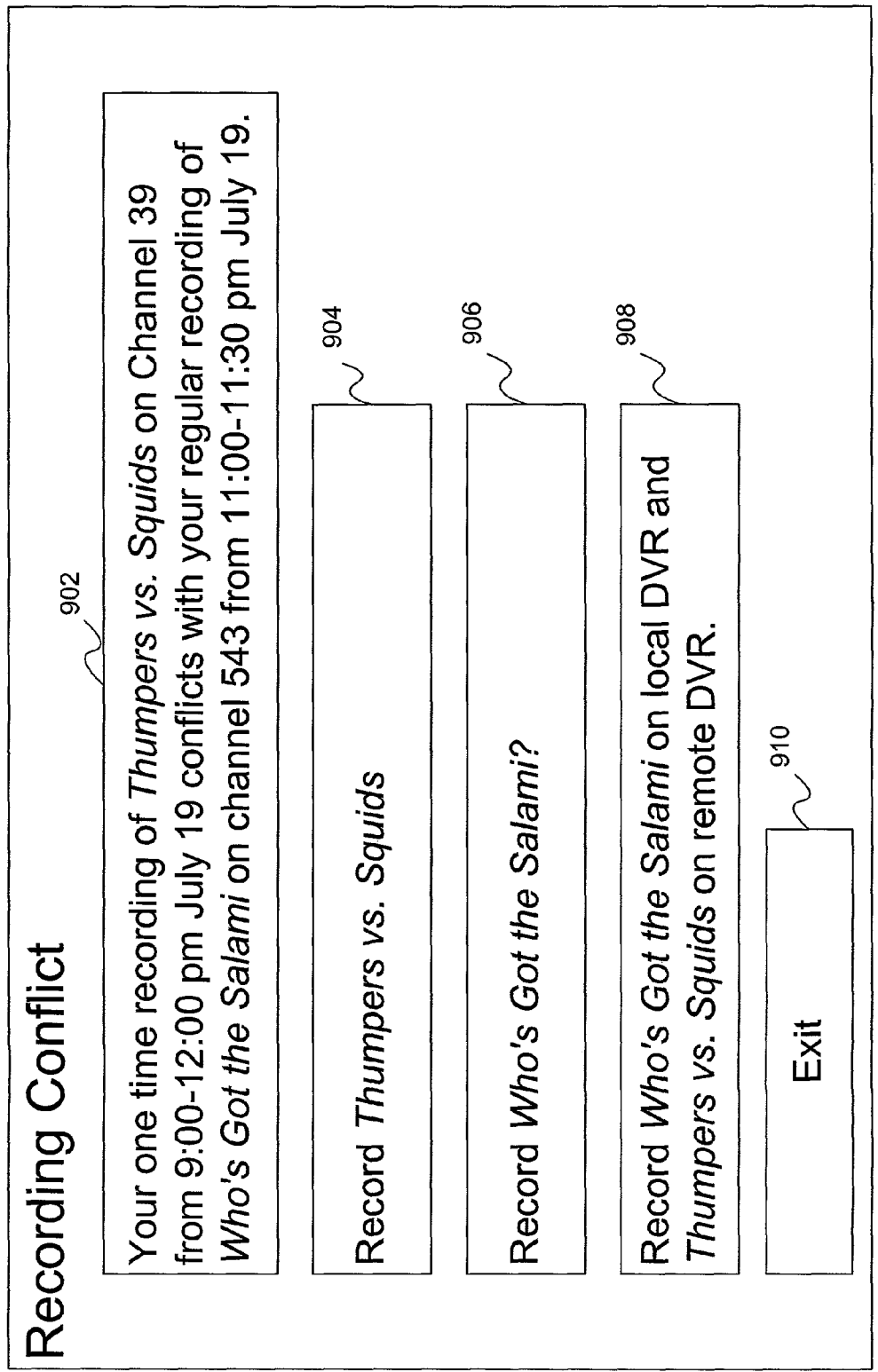
FIG. 9 is a graphical diagram illustrating an example of a conflict resolution display in accordance with the present invention.

FIG. 9 illustrates an example of a conflict resolution display 900 used in connection with the network conflict resolution embodiment of the present invention. The conflict resolution display 900 includes recording conflict description region 902, a button 904 that allows election of the previously scheduled recording, a button 906 that allows election of the newly requested recording, and a button 908 that retains the recording of the previous selection on a local DVR and schedules the recording of the new selection on a remote DVR. An exit button 910 allows a default operation, such as scheduling the newly selected recording on the remote DVR, or merely retaining the previously scheduled recording. As with the previous example of FIG. 5A, the recording conflict description region 902 preferably identifies the conflict and indicates whether the recording selections are single records or repeat records. Selection of button 908 retains the local recording queue and sends signals to the remote DVR so that the remote DVR recording queue is updated.

Figure 10:
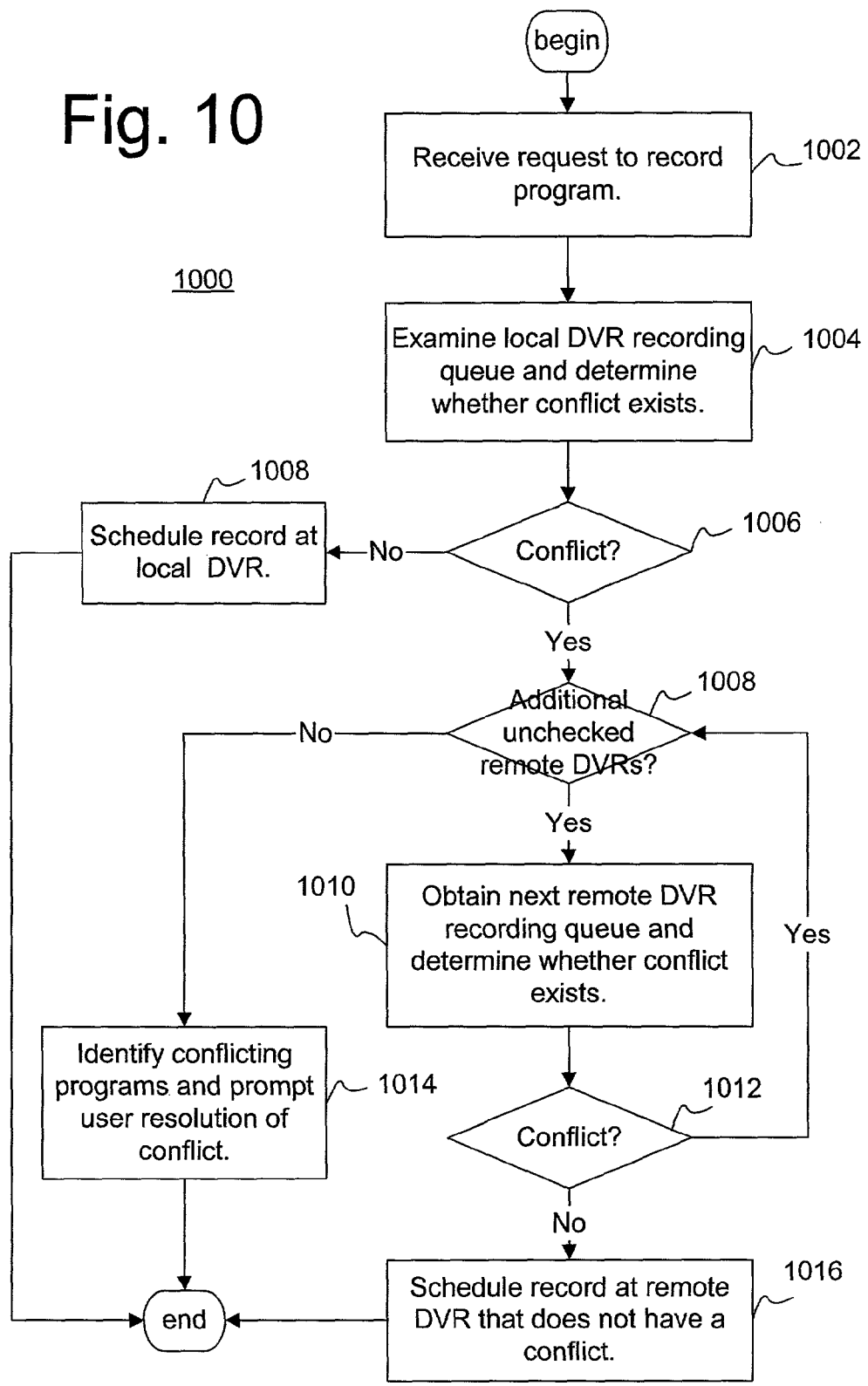
FIG. 10 is a flow diagram illustrating another embodiment of resolving conflicts in accordance with the present invention.

The flow diagram of FIG. 10 illustrates an embodiment of resolving conflicts where networked DVRs share recording resources. A request to record a program is received (1002) whereupon the local DVR recording queue is examined (1004) to determine the existence of a conflict. Where no conflict is determined (1006) the recording is scheduled for the local DVR and its recording queue is updated accordingly. Where a conflict at the local DVR is determined (1006) it is initially determined whether there are additional DVRs on the network with the local DVR. Where no additional DVRs are found, a conflict that cannot be resolved using network solely using available recording capacity on the network is found, so the conflict is identified (1014) for the user along with a prompt that requests resolution of the conflict. The type of conflict resolution display found in FIG. 5A would be appropriate for reporting such a conflict.

If there are additional unchecked remote DVRs, then the next available remote DVR recording queue is obtained (1010) to determine whether it could handle the newly requested record without conflict. If it is determined (1012) that there would be no conflict, then the record is scheduled (1016) at the remote DVR in question and its recording queue is updated accordingly. The update of the remote DVR recording queue can follow an identification of the conflict and receipt of confirmation that the user wants to record the program on the remote DVR using a display such as that of FIG. 9.

If it is determined (1012) that the remote DVR would have a conflict, the process of looking for additional unchecked remote DVRs and checking their recording queues to determine whether they have capacity to handle the newly requested record continues until all of the remote DVRs have been checked, or a remote DVR without a conflict is found.

Thus, methods and apparatus for resolving recording conflicts are provided in accordance with the present invention. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for a first digital video recorder resolving conflicts in scheduling the recording of programs, the method comprising:
    receiving a request to schedule a recording of a first program;
    determining a conflict between the request to schedule the recording of the first program and a previous request to schedule a recording of a second program;
    automatically presenting the conflict by providing an identification of the first program, an identification of the second program, and an interface for resolving the conflict in recording the first program and the second program; and
    requesting a second digital video recorder network connected to the first digital video recorder to obtain a second recording queue maintained on the second digital video recorder to determine whether the second recording queue could include the second program without conflict, and
    presenting an interface providing the option of recording the second program at the second digital video recorder for resolving the conflict.

2. The method of claim 1, wherein the conflict is determined where there is an overlap in a recording time of the first program and a recording time of the second program.

3. The method of claim 1, further comprising:
    receiving confirmation of the request to schedule the recording of the first program through the interface for resolving the conflict.

4. The method of claim 3, further comprising:
    providing a recording queue that includes a list of programs to be recorded, the recording queue including the second program; and
    adding the first program to the recording queue and removing the second program from the recording queue upon receiving confirmation of the request to schedule the recording of the first program.

5. The method of claim 3, further comprising:
    providing a recording queue that includes a list of programs to be recorded, the recording queue including the first program and the second program; and
    providing an exception list that identifies the conflict and indicates that the recording of the second program is preempted.

6. The method of claim 5, further comprising:
    providing a recording procedure that examines the recording queue to identify a candidate program for recording, and examines the exception list to determine whether the recording of the candidate program is preempted.

7. The method of claim 5, further comprising:
    receiving a cancellation of the request to record the first program; and
    removing the identification of the conflict from the exception list, whereby the request to record the second program is automatically reinstated.

8. The method of claim 3, further comprising:
    providing a recording queue that includes a list of programs to be recorded, the recording queue including the second program;
    determining that the second program belongs to a set of programs scheduled as a repeat record;
    adding the first program to the recording queue and providing an exception list that identifies the conflict and indicates that the recording of the second program is preempted, whereby programs other than the second program that belong to the set of programs remain scheduled for recording.

9. The method of claim 5, further comprising:
    providing a content guide display having a first entry for the first program and a second entry for the second program;
    providing a first visual indicator within the first entry, the first visual indicator indicating that the first program is scheduled for recording; and
    providing a second visual indicator within the second entry, the second visual indicator indicating that the second program was scheduled for recording, but has been preempted from recording.

10. The method of claim 1, wherein the conflict is determined based upon an examination of a first recording queue corresponding to a first digital video recorder, the first recording queue including the second program, and a chronological overlap between the first program and the second program is determined upon receipt of the request to record the first program.

11. A computer program product for a first digital video recorder resolving conflicts in scheduling the recording of programs, the computer program product stored on a computer readable medium to perform operations comprising:
receiving a request to schedule a recording of a first program;
determining a conflict between the request to schedule the recording of the first program and a previous request to schedule a recording of a second program;
automatically presenting the conflict by providing an identification of the first program, an identification of the second program, and an interface for resolving the conflict in recording the first program and the second program; and
requesting a second digital video recorder is network connected to the first digital video recorder to obtain a second recording queue maintained on the second digital video recorder to determine whether the second recording queue could include the second program without conflict, and
presenting an option of recording the second program at the second digital video recorder for resolving the conflict.

12. The computer program product of claim 11, wherein the conflict is determined where there is an overlap in a recording time of the first program and a recording time of the second program.

13. The computer program product of claim 11, wherein the operations further comprise:
receiving confirmation of the request to schedule the recording of the first program through the interface for resolving the conflict.

14. The computer program product of claim 13, wherein the operations further comprise:
providing a recording queue that includes a list of programs to be recorded, the recording queue including the second program; and
adding the first program to the recording queue and removing the second program from the recording queue upon receiving confirmation of the request to schedule the recording of the first program.

15. The computer program product of claim 13, wherein the operations further comprise:
providing a recording queue that includes a list of programs to be recorded, the recording queue including the first program and the second program; and
providing an exception list that identifies the conflict and indicates that the recording of the second program is preempted.

16. The computer program product of claim 15, wherein the operations further comprise:
providing a recording procedure that examines the recording queue to identify a candidate program for recording, and examines the exception list to determine whether the recording of the candidate program is preempted.

17. The computer program product of claim 15, wherein the operations further comprise:
receiving a cancellation of the request to record the first program; and
removing the identification of the conflict from the exception list, whereby the request to record the second program is automatically reinstated.

18. The computer program product of claim 15, wherein the operations further comprise:
providing a content guide display having a first entry for the first program and a second entry for the second program;
providing a first visual indicator within the first entry, the first visual indicator indicating that the first program is scheduled for recording; and
providing a second visual indicator within the second entry, the second visual indicator indicating that the second program was scheduled for recording, but has been preempted from recording.

19. The computer program product of claim 13, wherein the operations further comprise:
providing a recording queue that includes a list of programs to be recorded, the recording queue including the second program;
determining that the second program belongs to a set of programs scheduled as a repeat record;
adding the first program to the recording queue and providing an exception list that identifies the conflict and indicates that the recording of the second program is preempted, whereby programs other than the second program that belong to the set of programs remain scheduled for recording.

20. The computer program product of claim 11, wherein the conflict is determined based upon an examination of a first recording queue corresponding to a first digital video recorder, the first recording queue including the second program, and a chronological overlap between the first program and the second program is determined upon receipt of the request to record the first program.

21. An apparatus for a first digital video recorder resolving conflicts in scheduling the recording of programs, the apparatus comprising:
a recording candidate identifying module, configured to receive a request to schedule a recording of a first program;
a conflict handling module, in communication with the recording candidate identifying module, configured to determine a conflict between the request to schedule the recording of the first program and a previous request to schedule a recording of a second program;
a conflict reporting module, in communication with the conflict handling module, configured to automatically present the conflict by providing an identification of the first program, an identification of the second program, and an interface for resolving the conflict in recording the first program and the second program;
a second digital video recorder network connected to the first digital video recorder, and
a second recording queue maintained on the second digital video recorder, the second recording queue requested by the first digital video recorder to determine whether the second recording queue could include the second program without conflict, and the interface presents an option of recording the second program at the second digital video recorder for resolving the conflict.

22. The apparatus of claim 21, wherein the conflict handling module determines the conflict where there is an overlap in a recording time of the first program and a recording time of the second program.

23. The apparatus of claim 21, wherein the conflict reporting module is configured to receive confirmation of the request to schedule the recording of the first program through the interface for resolving the conflict.

24. The apparatus of claim 23, further comprising:
a recording queue module, configured to provide a recording queue that includes a list of programs to be recorded, the recording queue including the second program; and
wherein the conflict handling module is configured to add the first program to the recording queue and remove the second program from the recording queue upon receiving confirmation of the request to schedule the recording of the first program.

25. The apparatus of claim 23, further comprising:
a recording queue module, configured to provide a recording queue that includes a list of programs to be recorded, the recording queue including the first program and the second program, and an exception list that identifies the conflict and indicates that the recording of the second program is preempted.

26. The apparatus of claim 25, wherein a recording procedure examines the recording queue to identify a candidate program for recording, and examines the exception list to determine whether the recording of the candidate program is preempted.

27. The apparatus of claim 25, wherein a cancellation of the request to record the first program causes the removal of the identification of the conflict from the exception list, whereby the request to record the second program is automatically reinstated.

28. The apparatus of claim 25, wherein the conflict reporting module provides a content guide display having a first entry for the first program and a second entry for the second program, with a first visual indicator within the first entry, the first visual indicator indicating that the first program is scheduled for recording, and a second visual indicator within the second entry, the second visual indicator indicating that the second program was scheduled for recording, but has been preempted from recording.

29. The apparatus of claim 23, further comprising:
a recording queue module, configured to provide a recording queue that includes a list of programs to be recorded, the list including the second program, and to provide an exception list; wherein the second program belongs to a set of programs scheduled as a repeat record; and wherein the conflict handling module adds the first program to the recording queue, and updates the exception list to identify the conflict and indicate that the recording of the second program is preempted, whereby programs other than the second program that belong to the set of programs remain scheduled for recording.

30. The apparatus of claim 21, wherein the conflict is determined based upon an examination of a first recording queue corresponding to a first digital video recorder, the first recording queue including the second program, and a chronological overlap between the first program and the second program is determined upon receipt of the request to record the first program.

* * * * *